United States Patent
Kim et al.

(10) Patent No.: US 11,773,191 B2
(45) Date of Patent: Oct. 3, 2023

(54) MODIFICATION INITIATOR AND MODIFIED CONJUGATED DIENE-BASED POLYMER INCLUDING THE SAME

(71) Applicant: LG Chem, Ltd., Seoul (KR)

(72) Inventors: Min Soo Kim, Daejeon (KR); Soo Yong Lee, Daejeon (KR); Won Mun Choi, Daejeon (KR)

(73) Assignee: LG Chem, Ltd.

( * ) Notice: Subject to any disclaimer, the term of this patent is extended or adjusted under 35 U.S.C. 154(b) by 314 days.

(21) Appl. No.: 17/212,192

(22) Filed: Mar. 25, 2021

(65) Prior Publication Data

US 2021/0206885 A1 Jul. 8, 2021

Related U.S. Application Data

(62) Division of application No. 16/083,730, filed as application No. PCT/KR2017/011008 on Sep. 29, 2017, now Pat. No. 10,995,157.

(30) Foreign Application Priority Data

Oct. 4, 2016 (KR) ........................ 10-2016-0127849

(51) Int. Cl.
| | |
|---|---|
| *C08C 19/42* | (2006.01) |
| *C08F 236/10* | (2006.01) |
| *C08F 2/44* | (2006.01) |
| *C08F 236/06* | (2006.01) |
| *C08F 8/30* | (2006.01) |
| *C08F 36/06* | (2006.01) |
| *C07F 7/08* | (2006.01) |
| *C08C 19/44* | (2006.01) |
| *C08C 19/25* | (2006.01) |
| *C08F 36/04* | (2006.01) |
| *C08F 8/42* | (2006.01) |
| *C08C 19/26* | (2006.01) |
| *B60C 1/00* | (2006.01) |
| *C08K 5/053* | (2006.01) |
| *C08K 5/06* | (2006.01) |

(52) U.S. Cl.
CPC ............... *C08C 19/42* (2013.01); *C07F 7/08* (2013.01); *C08C 19/25* (2013.01); *C08C 19/26* (2013.01); *C08C 19/44* (2013.01); *C08F 2/44* (2013.01); *C08F 8/30* (2013.01); *C08F 8/42* (2013.01); *C08F 36/04* (2013.01); *C08F 36/06* (2013.01); *C08F 236/06* (2013.01); *C08F 236/10* (2013.01); *B60C 1/0016* (2013.01); *C08K 5/053* (2013.01); *C08K 5/06* (2013.01)

(58) Field of Classification Search
CPC ......... C08C 19/42; C08C 19/25; C08C 19/26; C08C 19/44; C08F 236/10; C08F 4/08; C08F 236/06; C08F 36/06; C08F 36/04; C08K 5/053
See application file for complete search history.

(56) References Cited

U.S. PATENT DOCUMENTS

| | | | |
|---|---|---|---|
| 4,397,994 A | 8/1983 | Takeuchi et al. | |
| 4,526,934 A | 7/1985 | Oshima et al. | |
| 5,066,729 A * | 11/1991 | Stayer, Jr. ............. | B60C 1/0016 525/333.1 |
| 5,567,815 A * | 10/1996 | Hall ........................ | C08F 36/04 502/157 |
| 7,405,262 B2 | 7/2008 | Antkowiak et al. | |
| 7,528,199 B2 | 5/2009 | Taniguchi et al. | |
| 8,492,479 B2 | 7/2013 | Robert et al. | |
| 2006/0036050 A1 | 2/2006 | Antkowiak et al. | |
| 2007/0088132 A1 | 4/2007 | Taniguchi et al. | |
| 2010/0249270 A1* | 9/2010 | Robert ................... | C08C 19/44 524/506 |
| 2016/0237219 A1* | 8/2016 | Dire ...................... | B60C 1/0016 |
| 2016/0297948 A1 | 10/2016 | Herzog et al. | |
| 2016/0347877 A1 | 12/2016 | Lee et al. | |
| 2017/0204205 A1 | 7/2017 | Choi et al. | |

FOREIGN PATENT DOCUMENTS

| | | |
|---|---|---|
| CN | 101687999 A | 3/2010 |
| EP | 0693505 A1 | 1/1996 |
| EP | 2886566 A1 | 6/2015 |
| JP | H06271706 A | 9/1994 |
| JP | H08048707 A | 2/1996 |
| JP | H08048708 A | 2/1996 |
| JP | 2005533152 A | 11/2005 |
| KR | 101524623 B1 | 6/2015 |
| KR | 20160065733 A | 6/2016 |
| WO | 2005087814 A1 | 9/2005 |
| WO | 2016008507 A1 | 1/2016 |
| WO | 2016085285 A1 | 6/2016 |

OTHER PUBLICATIONS

Chinese Search Report for Application No. CN201780019151.3 dated Mar. 25, 2020.
Extended European Search Report including Written Opinion for Application No. 17858737.4 dated Jan. 31, 2019.
International Search Report for Application No. PCT/KR2017/011008 dated Jan. 17, 2018.

* cited by examiner

*Primary Examiner* — Doris L Lee
(74) *Attorney, Agent, or Firm* — Lerner David LLP

(57) ABSTRACT

The present invention relates to a modification initiator and a modified conjugated diene-based polymer including the same, and more particularly, the present invention provides a modification initiator including a compound represented by Formula 1, a modified conjugated diene-based polymer including the same, and a method of preparing a modified conjugated diene-based polymer.

10 Claims, No Drawings

MODIFICATION INITIATOR AND MODIFIED CONJUGATED DIENE-BASED POLYMER INCLUDING THE SAME

CROSS-REFERENCE TO RELATED APPLICATIONS

The present application is a divisional application of U.S. application Ser. No. 16/083,730 filed Sep. 10, 2018, which is a national phase entry under 35 U.S.C. § 371 of International Application No. PCT/KR2017/011008 filed Sep. 29, 2017, which claims priority from Korean Patent Application No. 10-2016-0127849 filed Oct. 4, 2016, the disclosures of which are incorporated herein by reference.

TECHNICAL FIELD

The present invention relates to a modification initiator and a modified conjugated diene-based polymer including the same, and more particularly, to a modification initiator containing a functional group having an excellent interaction with an inorganic filler and a modified conjugated diene-based polymer including the same.

BACKGROUND ART

In line with the recent demand for fuel-efficient cars, a conjugated diene-based polymer having adjustment stability represented by wet road surface resistance as well as low rolling resistance and excellent abrasion resistance and tensile properties is required as a rubber material for a tire.

In order to reduce the rolling resistance of a tire, there is a method of reducing a hysteresis loss of a vulcanized rubber, and rebound resilience at 50° C. to 80° C., tan δ, or Goodrich heat generation is used as an evaluation index of the vulcanized rubber. That is, it is desirable to use a rubber material having high rebound resilience at the above temperature or low tan δ or Goodrich heat generation.

A natural rubber, a polyisoprene rubber, or a polybutadiene rubber is known as a rubber material having a low hysteresis loss, but these rubbers may have low wet road surface resistance. Thus, recently, a conjugated diene-based polymer or copolymer, such as a styrene-butadiene rubber (hereinafter, referred to as "SBR") or a butadiene rubber (hereinafter, referred to as "BR"), is prepared by emulsion polymerization or solution polymerization to be used as a rubber for a tire. Among these polymerizations, the greatest advantage of the solution polymerization in comparison to the emulsion polymerization is that a vinyl structure content and a styrene content, which specify physical properties of the rubber, may be arbitrarily adjusted and its molecular weight and physical properties may be controlled by coupling or modification. Thus, the SBR prepared by the solution polymerization is widely used as a rubber material for a tire because it is easy to change a structure of the finally prepared SBR or BR, and movement of chain ends may be reduced and a coupling force with a filler, such as silica or carbon black, may be increased by coupling or modification of the chain ends.

In a case in which the solution-polymerized SBR is used as the rubber material for a tire, since a glass transition temperature of the rubber is increased by increasing a vinyl content in the SBR, physical properties, such as running resistance and braking force, required for a tire may not only be controlled, but fuel consumption may also be reduced by appropriately adjusting the glass transition temperature. The solution-polymerized SBR is prepared by using an anionic polymerization initiator, and is being used by coupling or modification of chain ends of the formed polymer using various modifiers. For example, U.S. Pat. No. 4,397,994 discloses a technique in which active anions at chain ends of a polymer, which is obtained by polymerization of styrene-butadiene in a non-polar solvent using alkyllithium as a monofunctional initiator, are bonded by using a binder such as a tin compound.

Carbon black and silica are being used as a reinforcing filler of a tire's tread, wherein, in a case in which the silica is used as the reinforcing filler, the hysteresis loss may be lowered and the wet road surface resistance may be improved. However, since the silica having a hydrophilic surface has a low affinity with the rubber in comparison to the carbon black having a hydrophobic surface, dispersibility may be poor, and, thus, there is a need to use a separate silane coupling agent to improve the dispersibility or provide coupling between the silica and the rubber. Therefore, a method of introducing a functional group having an affinity or reactivity with the silica into the ends of rubber molecules is being performed, but its effect is insufficient.

DISCLOSURE OF THE INVENTION

Technical Problem

The present invention provides a modification initiator containing a functional group having an excellent interaction with an inorganic filler, a modified conjugated diene-based polymer polymerized by initiation from the modification initiator, and a method of preparing the modified conjugated diene-based polymer.

Technical Solution

According to an aspect of the present invention, there is provided a modification initiator including a compound represented by Formula 1.

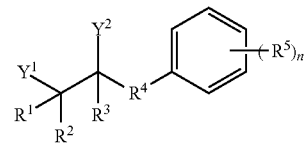

[Formula 1]

In Formula 1, $Y^1$ and $Y^2$ are each independently M or $R^{15}$, wherein $Y^2$ may be $R^{15}$ when $Y^1$ is M, and $Y^2$ may be M when $Y^1$ is $R^{15}$, M may be an alkali metal, $R^1$, $R^2$, $R^3$, and $R^{15}$ may each independently be hydrogen; an alkyl group having 1 to 30 carbon atoms; an alkenyl group having 2 to 30 carbon atoms; an alkynyl group having 2 to 30 carbon atoms; a heteroalkyl group having 1 to 30 carbon atoms which includes a nitrogen (N), oxygen (O), or sulfur (S) atom; a heteroalkenyl group having 2 to 30 carbon atoms which includes an N, O, or S atom; a heteroalkynyl group having 2 to 30 carbon atoms which includes an N, O, or S atom; a cycloalkyl group having 5 to 30 carbon atoms; an aryl group having 5 to 30 carbon atoms; or a heterocyclic group having 3 to 30 carbon atoms which includes at least one of N, O, and S atoms, $R^4$ may be a single bond; an alkylene group having 1 to 20 carbon atoms which is substituted or unsubstituted with an alkyl group having 1 to 10 carbon atoms, a cycloalkyl group having 5 to carbon atoms, or an aryl group having 5 to 20 carbon atoms; a cycloalkylene group having 5 to 20 carbon atoms which is substituted or unsubstituted with an alkyl group having 1 to 10 carbon atoms, a cycloalkyl group having 5 to carbon atoms, or an aryl group having 5 to 20 carbon atoms; or an arylene group having 5 to 20 carbon atoms which is substituted or unsubstituted with an alkyl group having 1 to 10 carbon atoms, a cycloalkyl group having 5 to 10 carbon atoms, or an aryl group having 5 to 20 carbon atoms, $R^5$ may be an alkyl group having 1 to 30 carbon atoms; an alkenyl group having 2 to 30 carbon atoms; an alkynyl group having 2 to 30 carbon atoms; a heteroalkyl group having 1 to 30 carbon atoms which includes an N, O, or S atom; a heteroalkenyl group having 2 to 30 carbon atoms which includes an N, O, or S atom; a heteroalkynyl group having 2 to 30 carbon atoms which includes an N, O, or S atom; a cycloalkyl group having 5 to 30 carbon atoms; an aryl group having 5 to 30 carbon atoms; a heterocyclic group having 3 to 30 carbon atoms which includes at least one of N, O, and S atoms; a functional group represented by Formula 2 below; or a functional group represented by Formula 3 below, n may be an integer selected from 1 to 5, at least one of $R^5$ may be the functional group represented by Formula 2 or 3 below, and a plurality of $R^5$ may be the same or different from each other when n is an integer selected from 2 to 5,

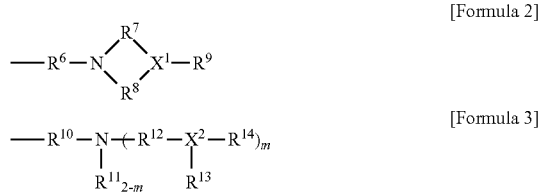

[Formula 2]

[Formula 3]

in Formulae 2 and 3, $R^6$ and $R^{10}$ may each independently be an alkylene group having 1 to 20 carbon atoms which is substituted or unsubstituted with an alkyl group having 1 to 10 carbon atoms, a cycloalkyl group having 5 to 10 carbon atoms, or an aryl group having 5 to 20 carbon atoms; a cycloalkylene group having 5 to 20 carbon atoms which is substituted or unsubstituted with an alkyl group having 1 to 10 carbon atoms, a cycloalkyl group having 5 to 10 carbon atoms, or an aryl group having 5 to 20 carbon atoms; or an arylene group having 5 to 20 carbon atoms which is substituted or unsubstituted with an alkyl group having 1 to carbon atoms, a cycloalkyl group having 5 to 10 carbon atoms, or an aryl group having 5 to 20 carbon atoms, $R^{-7}$, $R^8$, and $R^{12}$ may each independently be an alkylene group having 1 to 20 carbon atoms which is substituted or unsubstituted with an alkyl group having 1 to 10 carbon atoms, a cycloalkyl group having 5 to 10 carbon atoms, or an aryl group having 5 to 20 carbon atoms, $R^9$, $R^{11}$, $R^{13}$, and $R^{14}$ may each independently be hydrogen; an alkyl group having 1 to 30 carbon atoms; an alkenyl group having 2 to 30 carbon atoms; an alkynyl group having 2 to 30 carbon atoms; a heteroalkyl group having 1 to 30 carbon atoms which includes an N, O, or S atom; a heteroalkenyl group having 2 to 30 carbon atoms which includes an N, O, or S atom; a heteroalkynyl group having 2 to 30 carbon atoms which includes an N, O, or S atom; a cycloalkyl group having 5 to 30 carbon atoms; an aryl group having 5 to 30 carbon atoms; a heterocyclic group having 3 to 30 carbon atoms which includes at least one of N, O, and S atoms; an alkenyl group having 2 to 30 carbon atoms which is substituted with an alkyl group having 1 to 10 carbon atoms which includes an alkali metal; or an aryl group having 6 to 30 carbon atoms which is substituted with an alkyl group having 1 to 10 carbon atoms which includes an alkali metal, $X^1$ and $X^2$ may each independently be one selected from N, O, and S atoms, $R^9$ may not be present when $X^1$ is an O or S atom, $R^{14}$ may not be present when $X^2$ is an O or S atom, and m may be an integer of 1 or 2.

According to another aspect of the present invention, there is provided a modified conjugated diene-based polymer including a conjugated diene-based monomer-derived repeating unit, and a modification initiator-derived function group including a compound represented by Formula 1 at one end.

According to another aspect of the present invention, there is provided a method of preparing a modified conjugated diene-based polymer which includes a step (S1) of preparing an active polymer coupled with an alkali metal by polymerization of a conjugated diene-based monomer, or an aromatic vinyl-based monomer with a conjugated diene-based monomer in a hydrocarbon solvent which includes a modification initiator including a compound represented by Formula 1.

According to another aspect of the present invention, there is provided a rubber composition including the modified conjugated diene-based polymer.

Advantageous Effects

Since polymerization is initiated by a modification initiator containing a functional group having an excellent interaction with an inorganic filler to include a modification initiator-derived function group at one end according to the present invention, preparation of a modified conjugated diene-based polymer having excellent mutual dispersibility with the inorganic filler is possible, and the modified conjugated diene-based polymer thus prepared may have excellent processability, tensile strength, abrasion resistance, rolling resistance, and wet road surface resistance.

Also, since the modified conjugated diene-based polymer polymerized by the modification initiator has an anion active site at the other end in addition to the one end including the modification initiator-derived function group, additional modification at the other end is possible by a modifier, and accordingly, since the modified conjugated diene-based polymer, in which the other end is modified with the modifier, includes the modification initiator-derived function group and a modifier-derived function group respectively at both ends at the same time, an affinity with the inorganic filler may be maximized.

MODE FOR CARRYING OUT THE INVENTION

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The expression "modification initiator" in the present invention may denote a polymerization initiator for initiating a polymerization reaction, and may denote that the polymerization initiator includes a modified functional group of a polymer, wherein the modification initiator, for example, may be a modification initiator for initiating polymerization of a conjugated diene-based polymer, and, in this case, activity is high and sufficient randomization of monomers may be ensured.

The expressions "derived unit" and "derived functional group" in the present invention may denote a component or structure generated from a certain material or may denote the material itself.

The modification initiator according to the present invention may include a compound represented by Formula 1 below.

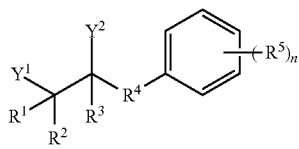

[Formula 1]

In Formula 1, $Y^1$ and $Y^2$ are each independently M or $R^{15}$, wherein $Y^2$ may be $R^{15}$ when $Y^1$ is M, and $Y^2$ may be M when $Y^1$ is $R^{15}$, M may be an alkali metal, $R^1$, $R^2$, $R^3$, and $R^{15}$ may each independently be hydrogen; an alkyl group having 1 to 30 carbon atoms; an alkenyl group having 2 to 30 carbon atoms; an alkynyl group having 2 to 30 carbon atoms; a heteroalkyl group having 1 to 30 carbon atoms which includes a nitrogen (N), oxygen (O), or sulfur (S) atom; a heteroalkenyl group having 2 to 30 carbon atoms which includes an N, O, or S atom; a heteroalkynyl group having 2 to 30 carbon atoms which includes an N, O, or S atom; a cycloalkyl group having 5 to 30 carbon atoms; an aryl group having 5 to 30 carbon atoms; or a heterocyclic group having 3 to 30 carbon atoms which includes at least one of N, O, and S atoms, $R^4$ may be a single bond; an alkylene group having 1 to 20 carbon atoms which is substituted or unsubstituted with an alkyl group having 1 to 10 carbon atoms, a cycloalkyl group having 5 to 10 carbon atoms, or an aryl group having 5 to 20 carbon atoms; a cycloalkylene group having 5 to 20 carbon atoms which is substituted or unsubstituted with an alkyl group having 1 to 10 carbon atoms, a cycloalkyl group having 5 to 10 carbon atoms, or an aryl group having 5 to 20 carbon atoms; or an arylene group having 5 to 20 carbon atoms which is substituted or unsubstituted with an alkyl group having 1 to 10 carbon atoms, a cycloalkyl group having 5 to 10 carbon atoms, or an aryl group having 5 to 20 carbon atoms, $R^5$ may be an alkyl group having 1 to 30 carbon atoms; an alkenyl group having 2 to 30 carbon atoms; an alkynyl group having 2 to 30 carbon atoms; a heteroalkyl group having 1 to 30 carbon atoms which includes an N, O, or S atom; a heteroalkenyl group having 2 to 30 carbon atoms which includes an N, O, or S atom; a heteroalkynyl group having 2 to 30 carbon atoms which includes an N, O, or S atom; a cycloalkyl group having 5 to 30 carbon atoms; an aryl group having 5 to 30 carbon atoms; a heterocyclic group having 3 to 30 carbon atoms which includes at least one of N, O, and S atoms; a functional group represented by Formula 2 below; or a functional group represented by Formula 3 below, n may be an integer selected from 1 to 5, at least one of $R^5$ may be the functional group represented by Formula 2 or 3 below, and a plurality of $R^5$ may be the same or different from each other when n is an integer selected from 2 to 5,

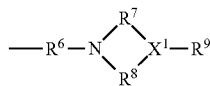

[Formula 2]

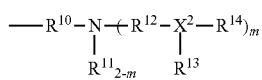

[Formula 3]

in Formulae 2 and 3, $R^6$ and $R^{10}$ may each independently be an alkylene group having 1 to 20 carbon atoms which is substituted or unsubstituted with an alkyl group having 1 to 10 carbon atoms, a cycloalkyl group having 5 to 10 carbon atoms, or an aryl group having 5 to 20 carbon atoms; a cycloalkylene group having 5 to 20 carbon atoms which is substituted or unsubstituted with an alkyl group having 1 to 10 carbon atoms, a cycloalkyl group having 5 to 10 carbon atoms, or an aryl group having 5 to 20 carbon atoms; or an arylene group having 5 to 20 carbon atoms which is substituted or unsubstituted with an alkyl group having 1 to 10 carbon atoms, a cycloalkyl group having 5 to 10 carbon atoms, or an aryl group having 5 to 20 carbon atoms, $R^7$, $R^8$, and $R^{12}$ may each independently be an alkylene group having 1 to 20 carbon atoms which is substituted or unsubstituted with an alkyl group having 1 to 10 carbon atoms, a cycloalkyl group having 5 to 10 carbon atoms, or an aryl group having 5 to 20 carbon atoms, $R^9$, $R^{11}$, $R^{13}$, and $R^{14}$ may each independently be hydrogen; an alkyl group having 1 to 30 carbon atoms; an alkenyl group having 2 to 30 carbon atoms; an alkynyl group having 2 to 30 carbon atoms; a heteroalkyl group having 1 to 30 carbon atoms which includes an N, O, or S atom; a heteroalkenyl group having 2 to 30 carbon atoms which includes an N, O, or S atom; a heteroalkynyl group having 2 to 30 carbon atoms which includes an N, O, or S atom; a cycloalkyl group having 5 to 30 carbon atoms; an aryl group having 5 to 30 carbon atoms; a heterocyclic group having 3 to 30 carbon atoms which includes at least one of N, O, and S atoms; an alkenyl group having 2 to 30 carbon atoms which is substituted with a linear or branched alkyl group having 1 to 10 carbon atoms which includes an alkali metal; or an aryl group having 6 to 30 carbon atoms which is substituted with an alkyl group having 1 to 10 carbon atoms which includes an alkali metal, $X^1$ and $X^2$ may each independently be one selected from N, O, and S atoms, $R^9$ may not be present when $X^1$ is an O or S atom, $R^{14}$ may not be present when $X^2$ is an O or S atom, and m may be an integer of 1 or 2.

Specifically, in Formula 1, $Y^1$ and $Y^2$ are each independently M or $R^{15}$, wherein $Y^2$ may be $R^{15}$ when $Y^1$ is M, and $Y^2$ may be M when $Y^1$ is $R^{15}$, M may be an alkali metal, $R^1$, $R^2$, $R^3$, and $R^{15}$ may each independently be hydrogen; an alkyl group having 1 to 30 carbon atoms; an alkenyl group having 2 to 30 carbon atoms; and an alkynyl group having 2 to 30 carbon atoms, $R^4$ may be a single bond; or an unsubstituted alkylene group having 1 to 20 carbon atoms, $R^5$ may be an alkyl group having 1 to 30 carbon atoms; an alkenyl group having 2 to 30 carbon atoms; an alkynyl group having 2 to 30 carbon atoms; a functional group represented by Formula 2; or a functional group represented by Formula 3, n may be an integer selected from 1 to 5, at least one of $R^5$ may be the functional group represented by Formula 2 or 3, and a plurality of $R^5$ may be the same or different from each other when n is an integer selected from 2 to 5, and in Formulae 2 and 3, $R^6$ and $R^{10}$ may each independently be an unsubstituted alkylene group having 1 to 20 carbon atoms, $R^7$, $R^8$, and $R^{12}$ may each independently be an unsubstituted alkylene group having 1 to 20 carbon atoms, $R^9$, $R^{11}$, $R^{13}$, and $R^{14}$ may each independently be hydrogen; an alkyl group having 1 to 30 carbon atoms; a cycloalkyl group having 5 to 30 carbon atoms; an aryl group having 5 to 30 carbon atoms; an alkenyl group having 2 to 30 carbon atoms which is substituted with an alkyl group having 1 to 10 carbon atoms which includes an alkali metal; or an aryl group having 6 to 30 carbon atoms which is substituted with an alkyl group having 1 to 10 carbon atoms which includes an alkali metal, $X^1$ and $X^2$ may each independently be an N atom, and m may be an integer of 1 or 2.

As a specific example, the compound represented by Formula 1 may be one selected from the group consisting of compounds represented by Formulae 1-1 to 1-13 below.

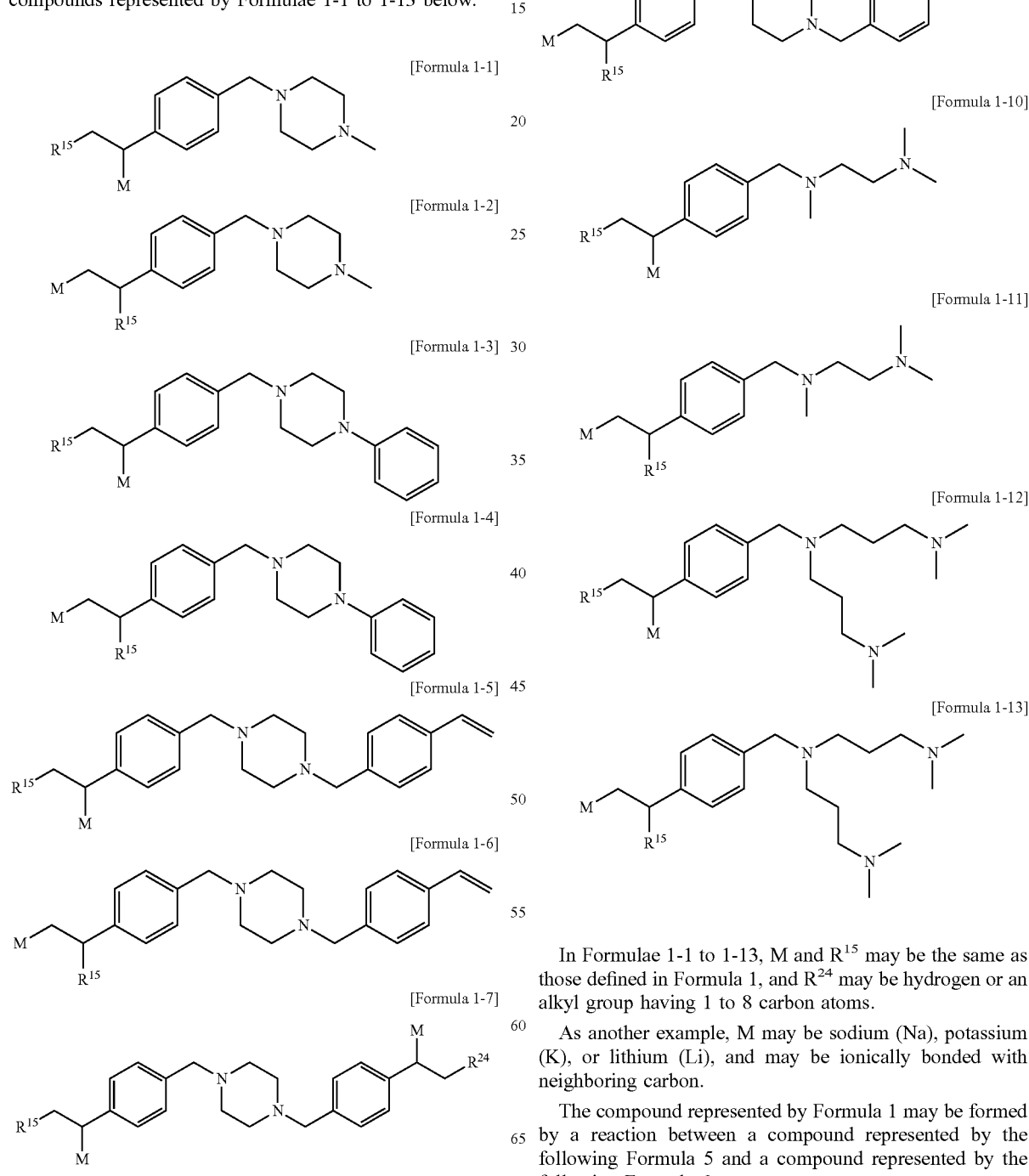

In Formulae 1-1 to 1-13, M and $R^{15}$ may be the same as those defined in Formula 1, and $R^{24}$ may be hydrogen or an alkyl group having 1 to 8 carbon atoms.

As another example, M may be sodium (Na), potassium (K), or lithium (Li), and may be ionically bonded with neighboring carbon.

The compound represented by Formula 1 may be formed by a reaction between a compound represented by the following Formula 5 and a compound represented by the following Formula 6.

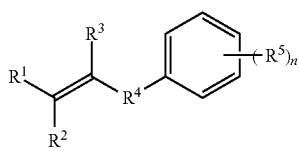

[Formula 5]

M-R$^{15}$ [Formula 6]

In Formulae 5 and 6, the definition of each substituent is as defined above.

According to an embodiment of the present invention, the compound represented by Formula 5 and the compound represented by Formula 6 may be reacted in a molar ratio of 1:1, and, in this case, a side reaction, such as oligomer formation, may be minimized.

In order for the compound represented by Formula 5 and the compound represented by Formula 6 to be reacted in a molar ratio of 1:1, the compound represented by Formula 5 may be added in an amount of 1 mol to 10 mol, 1 mol to 5 mol, or mol to 3 mol with respect to 1 mol of the compound represented by Formula 6 during the reaction, and, since the adjustment of the reaction molar ratio according to loss and deactivation of the compound represented by Formula 5 or the compound represented by Formula 6 by reaction environment during the reaction is possible while minimizing the side reaction within this range, the compound represented by Formula 5 and the compound represented by Formula 6 may be finally adjusted to a reaction molar ratio of 1:1.

A modified conjugated diene-based polymer according to the present invention may include a conjugated diene-based monomer-derived repeating unit, and may include a modification initiator-derived function group including a compound represented by the following Formula 1 at one end.

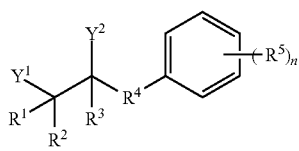

[Formula 1]

The definition of each substituent of Formula 1 is as defined above.

The conjugated diene-based monomer-derived repeating unit may denote a repeating unit formed by polymerization of a conjugated diene-based monomer, and the conjugated diene-based monomer, for example, may include at least one selected from the group consisting of 1,3-butadiene, 2,3-dimethyl-1,3-butadiene, piperylene, 3-butyl-1,3-octadiene, isoprene, 2-phenyl-1,3-butadiene, and 2-halo-1,3-butadiene (the expression "halo" denotes a halogen atom).

The modified conjugated diene-based polymer may be a copolymer further including an aromatic vinyl monomer-derived repeating unit in addition to the conjugated diene-based monomer-derived repeating unit.

The aromatic vinyl monomer-derived repeating unit may denote a repeating unit formed by polymerization of an aromatic vinyl monomer, and the aromatic vinyl monomer, for example, may include at least one selected from the group consisting of styrene, α-methylstyrene, 3-methylstyrene, 4-methylstyrene, 4-propylstyrene, 1-vinylnaphthalene, 4-cyclohexylstyrene, 4-(p-methylphenyl)styrene, and 1-vinyl-5-hexylnaphthalene.

In a case in which the modified conjugated diene-based polymer is the copolymer including the aromatic vinyl monomer-derived repeating unit, the modified conjugated diene-based polymer may include the conjugated diene-based monomer-derived repeating unit in an amount of 50 wt % to 95 wt %, 55 wt % to 90 wt %, or 60 wt % to 90 wt %, and the aromatic vinyl monomer-derived repeating unit in an amount of 5 wt % to 50 wt %, 10 wt % to 45 wt %, or 10 wt % to 40 wt %, and rolling resistance, wet road surface resistance, and abrasion resistance are excellent within this range.

According to an embodiment of the present invention, the copolymer may be a random copolymer, and, in this case, a balance between physical properties is excellent. The random copolymer may denote that repeating units constituting the copolymer are disorderly arranged.

As another example, the modified conjugated diene-based polymer may include a modifier-derived functional group at the other end. The modifier-derived functional group may denote a functional group in a polymer formed by a reaction of a modifier with an active site of the conjugated diene-based polymer, and the functional group may improve mechanical properties, such as rolling resistance and wet road surface resistance, as well as dispersibility and processability of the conjugated diene-based polymer.

The modifier according to an embodiment of the present invention may include a compound represented by Formula 4 below.

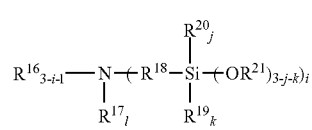

[Formula 4]

In Formula 4, $R^{16}$ and $R^{17}$ may each independently be hydrogen, a hydrocarbon group having 1 to 30 carbon atoms, or a glycol unit represented by

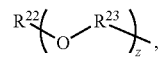

$R^{18}$ may be a divalent hydrocarbon group having 1 to 30 carbon atoms, $R^{19}$ to $R^{22}$ may each independently be a monovalent hydrocarbon group having 1 to 30 carbon atoms, $R^{23}$ may be a divalent hydrocarbon group having 1 to 10 carbon atoms, j and k may each independently be 0 or 1, z may be an integer selected from 1 to 10, at least one of $R^{16}$ and $R^{17}$ may be a glycol unit represented by

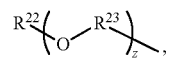

i and 3-i-l may each independently be 1 or 2, but may not be 2 at the same time, and 1 may be 0 or 1 when $R^{16}$ is a glycol unit represented by

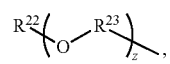

i and l may each independently be 1 or 2, but may not be 2 at the same time, and 3-i-l may be 0 or 1 when $R^{17}$ is a glycol unit represented by

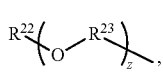

and i may be 1 or 2, and l and 3-i-l may each independently be 0 or 1, but may not be 0 at the same time when both $R^{16}$ and $R^{17}$ are glycol units represented by

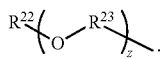

Specifically, in Formula 4, $R^{16}$ and $R^{17}$ may each independently be a glycol unit represented by

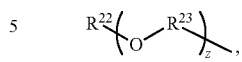

$R^{18}$ may be an alkylene group having 1 to 10 carbon atoms, $R^{19}$ to $R^{22}$ may each independently be an alkyl group having 1 to 10 carbon atoms, $R^{23}$ may be an alkylene group having 1 to 5 carbon atoms, i may be 1 or 2, j and k may each independently be 0 or 1, l and 3-i-l may each independently be 0 or 1, but may not be 0 at the same time, and n may be an integer selected from 2 to 8.

For example, the compound represented by Formula 4 may be one selected from the group consisting of compounds represented by Formulae 4a to 4e below.

[Formula 4a]
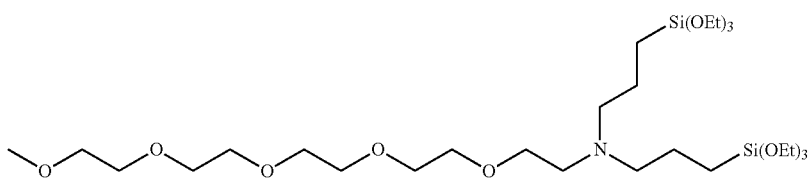

[Formula 4b]
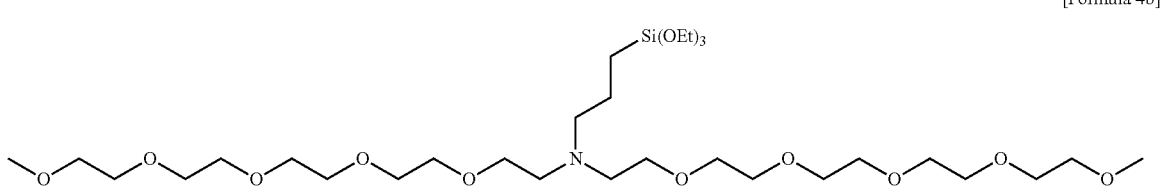

[Formula 4c]

[Formula 4d]
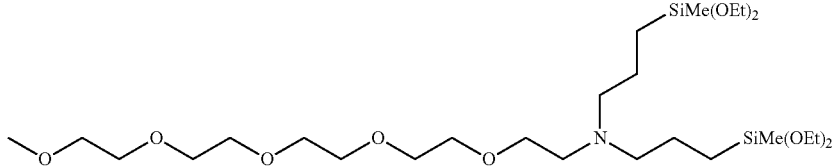

[Formula 4e]
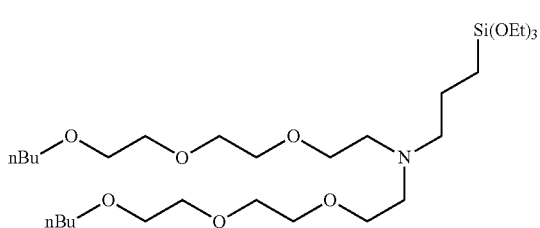

In Formulae 4a to 4e, Me is a methyl group, Et is an ethyl group, and nBu is an n-butyl group.

The modified conjugated diene-based polymer according to an embodiment of the present invention may have a number-average molecular weight (Mn) of 10,000 g/mol to 2,000,000 g/mol, 10,000 g/mol to 1,000,000 g/mol, or 100,000 g/mol to 500,000 g/mol, and may have a weight-average molecular weight (Mw) of 10,000 g/mol to 3,000,000 g/mol, 10,000 g/mol to 2,000,000 g/mol, or 100,000 g/mol to 1,500,000 g/mol, and the rolling resistance and wet road surface resistance are excellent within this range. As another example, the modified conjugated diene-based polymer may have a molecular weight distribution (Mw/Mn) of 1.0 to 5.0, 1.0 to 3.0, or 1.0 to 2.5, and the balance between physical properties is excellent within this range.

As another example, the modified conjugated diene-based polymer may have a Mooney viscosity (ML1+4, @100° C.) of 10 to 180, 20 to 150, or 50 to 100, and processability and productivity are excellent within this range.

Also, the modified conjugated diene-based polymer may have a vinyl bond content in the conjugated diene-based monomer-derived repeating unit of 5 wt % to 50 wt %, 10 wt % to 45 wt %, or 20 wt % to 45 wt %, based on the modified conjugated diene-based polymer, and since a glass transition temperature may be adjusted to an appropriate range, the rolling resistance, wet road surface resistance, and low fuel consumption property are excellent within this range. Herein, the vinyl bond content may denote a content of a 1,2-added conjugated diene-based monomer rather than a 1,4-added conjugated diene-based monomer based on 100 wt % of the conjugated diene-based polymer composed of the conjugated diene-based monomer-derived repeating unit, or the conjugated diene-based copolymer composed of the conjugated diene-based monomer-derived repeating unit and the aromatic vinyl-based monomer.

A method of preparing a modified conjugated diene-based polymer according to the present invention may include a step (S1) of preparing an active polymer coupled with an alkali metal by polymerization of a conjugated diene-based monomer, or an aromatic vinyl-based monomer with a conjugated diene-based monomer in a hydrocarbon solvent in the presence of a modification initiator including a compound represented by Formula 1 below.

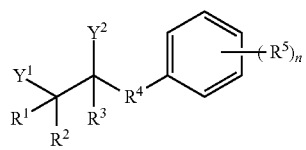

[Formula 1]

The definition of each substituent of Formula 1 is as defined above.

The hydrocarbon solvent is not particularly limited, but, for example, may be at least one selected from the group consisting of n-pentane, n-hexane, n-heptane, isooctane, cyclohexane, toluene, benzene and xylene.

According to an embodiment of the present invention, the compound represented by Formula 1 may be used in an amount of 0.01 mmol to 10 mmol, 0.05 mmol to 5 mmol, 0.1 mmol to 2 mmol, or 0.1 mmol to 1 mmol based on total 100 g of the monomer.

The polymerization of the step (S1), for example, may be anionic polymerization, and, specifically, may be living anionic polymerization in which an anionic active site at polymerization end is obtained by a growth polymerization reaction by anions. Also, the polymerization of the step (S1) may be temperature rise polymerization, isothermal polymerization, or constant temperature polymerization (adiabatic polymerization), the constant temperature polymerization may denote a polymerization method including a step of performing polymerization not by randomly applying heat but with its own reaction heat after an organometallic compound is added, the temperature rise polymerization may denote a polymerization method in which the temperature is increased by randomly applying heat after the organometallic compound is added, and the isothermal polymerization may denote a polymerization method in which the temperature of the polymer is constantly maintained by taking away heat or applying heat after the organometallic compound is added. Furthermore, the polymerization of the step (S1), for example, may be performed in a temperature range of −20° C. to 200° C., 0° C. to 150° C., or 10° C. to 120° C.

The active polymer prepared in the step (S1) may denote a polymer in which a polymeric anion is combined with an organometallic cation.

According to an embodiment of the present invention, a step (S2) of reacting the active polymer prepared in the step (S1) with a modifier may be included. The modifier, for example, may include a compound represented by Formula 4 below. Specifically, the preparation method according to an embodiment of the present invention may include a step (S2) of reacting the active polymer with an alkoxy silane-based modifier including a compound represented by Formula 4 below.

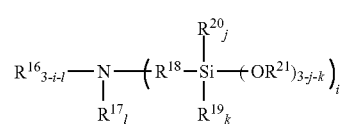

[Formula 4]

The definition of each substituent of Formula 4 is as defined above.

According to an embodiment of the present invention, a molar ratio of the compound represented by Formula 1 to the modifier may be in a range of 1:0.1 to 1:10, 1:0.1 to 1:5, or 1:0.1 to 1:2, and, since the optimal modification reaction may be performed within this range, a conjugated diene-based polymer having a high modification ratio may be obtained.

The reaction of the step (S2) is a modification reaction for the introduction of a functional group derived from the alkoxy silane-based modifier including the compound represented by Formula 4 into the active polymer, wherein the reaction may be performed in a temperature range of 0° C. to 90° C. for 1 minute to 5 hours.

As another example, the polymerization of the step (S1) may be performed by including a polar additive, and the polar additive may be added in an amount of 0.001 g to 50 g, 0.001 g to 10 g, or 0.005 g to 0.1 g, based on total 100 g of the monomer. Also, the polar additive may be at least one selected from the group consisting of tetrahydrofuran, ditetrahydrofurylpropane, diethylether, cycloamylether, dipropyl ether, ethylene dimethyl ether, diethyl glycol, dimethyl ether, tertiary butoxyethoxyethane, bis(3-dimethylaminoethyl)ether, (dimethylaminoethyl)ethylether, trimethylamine, triethylamine, tripropylamine, and tetramethylethylenediamine, and, for example, may be triethylamine, or tetramethylethylenediamine, the polar additive may be the same or different from a polar additive which may be added during the preparation of the aminosilane-based compound, and, in a case in which the conjugated diene-based monomers, or the conjugated diene-based monomer and the aromatic vinyl-based monomer are copolymerized by including the polar additive, since the polar additive compensates a difference in reaction rates of these monomers, it has an effect of inducing the random copolymer to be easily formed.

Also, according to an embodiment of the present invention, the method of preparing a modified conjugated diene-based polymer may be performed by a batch polymerization method or a continuous polymerization method including one or more reactors.

The method of preparing a modified conjugated diene-based polymer, for example, may further include at least one step of recovering solvent and unreacted monomer and drying, if necessary, after the step (S2).

According to the present invention, provided is a rubber composition including the above-described modified conjugated diene-based polymer.

The rubber composition may include the modified conjugated diene-based polymer in an amount of 10 wt % or more, 10 wt % to 100 wt %, or 20 wt % to 90 wt %, and mechanical properties, such as tensile strength and abrasion resistance, are excellent and the balance between physical properties is excellent within this range.

Furthermore, the rubber composition may further include another rubber component, if necessary, in addition to the modified conjugated diene-based polymer, and, in this case, the rubber component may be included in an amount of 90 wt % or less based on a total weight of the rubber composition. Specifically, the other rubber component may be included in an amount of 1 part by weight to 900 parts by weight based on 100 parts by weight of the modified conjugated diene-based polymer.

The rubber component, for example, may be a natural rubber or a synthetic rubber, and specific examples of the rubber component may be a natural rubber (NR) including cis-1,4-polyisoprene; a modified natural rubber, such as an epoxidized natural rubber (ENR), a deproteinized natural rubber (DPNR), and a hydrogenated natural rubber, in which the general natural rubber is modified or purified; and a synthetic rubber such as a styrene-butadiene rubber (SBR), polybutadiene (BR), polyisoprene (IR), a butyl rubber (IIR), an ethylene-propylene copolymer, polyisobutylene-co-isoprene, neoprene, poly(ethylene-co-propylene), poly(styrene-co-butadiene), poly(styrene-co-isoprene), poly(styrene-co-isoprene-co-butadiene), poly(isoprene-co-butadiene), poly(ethylene-co-propylene-co-diene), a polysulfide rubber, an acrylic rubber, an urethane rubber, a silicon rubber, an epichlorohydrin rubber, a butyl rubber, and a halogenated butyl rubber. Any one thereof or a mixture of two or more thereof may be used.

The rubber composition, for example, may include 0.1 part by weight to 200 parts by weight or 10 parts by weight to 120 parts by weight of a filler based on 100 parts by weight of the modified conjugated diene-based polymer of the present invention. The filler, for example, may be a silica-based filler, specific examples of the silica-based filler may be wet silica (hydrous silicic acid), dry silica (anhydrous silicic acid), calcium silicate, aluminum silicate, or colloidal silica, and the filler may preferably be wet silica in which an effect of improving both fracture characteristics and wet grip is the most significant. Also, the rubber composition may further include a carbon black-based filler, if necessary.

As another example, in a case in which silica is used as the filler, a silane coupling agent for the improvement of reinforcement and low heat generation property may be used together. Specific examples of the silane coupling agent may be bis(3-triethoxysilylpropyl)tetrasulfide, bis(3-triethoxysilylpropyl)trisulfide, bis(3-triethoxysilylpropyl)disulfide, bis (2-triethoxysilylethyl)tetrasulfide, bis(3-trimethoxysilylpropyl)tetrasulfide, bis(2-trimethoxysilylethyl)tetrasulfide, 3-mercaptopropyl trimethoxysilane, 3-mercaptopropyl triethoxysilane, 2-mercaptoethyl trimethoxysilane, 2-mercaptoethyl triethoxysilane, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 3-trimethoxysilylpropyl benzothiazolyl tetrasulfide, 3-triethoxysilylpropyl benzolyl tetrasulfide, 3-triethoxysilylpropyl methacrylate monosulfide, 3-trimethoxysilylpropyl methacrylate monosulfide, bis(3-diethoxymethylsilylpropyl)tetrasulfide, 3-mercaptopropyl dimethoxymethylsilane, dimethoxymethylsilylpropyl-N,N-dimethylthiocarbamoyl tetrasulfide, or dimethoxymethylsilylpropyl benzothiazolyl tetrasulfide, and any one thereof or a mixture of two or more thereof may be used. In consideration of the effect of improving the reinforcement, the silane coupling agent may preferably be bis(3-triethoxysilylpropyl)polysulfide or 3-trimethoxysilylpropyl benzothiazyl tetrasulfide.

Also, in the rubber composition according to an embodiment of the present invention, since the modified conjugated diene-based polymer, in which a function group having a high affinity with the silica is introduced into the active site, is used as the rubber component, a mixing amount of the silane coupling agent may be reduced in comparison to a conventional case. Accordingly, the silane coupling agent may be used in an amount of 1 part by weight to 20 parts by weight or 5 parts by weight to 15 parts by weight based on 100 parts by weight of the silica. Within this range, the silane coupling agent may prevent gelation of the rubber component while sufficiently having an effect as a coupling agent.

The rubber composition according to the embodiment of the present invention may be sulfur cross-linkable, and may further include a vulcanizing agent. The vulcanizing agent may specifically be sulfur powder, and may be included in an amount of 0.1 part by weight to 10 parts by weight based on 100 parts by weight of the rubber component, and, within this range, the low fuel consumption property is excellent while securing elastic modulus and strength required for the vulcanized rubber composition.

The rubber composition according to the embodiment of the present invention may further include various additives, such as a vulcanization accelerator, process oil, a plasticizer, an antioxidant, a scorch inhibitor, zinc white, stearic acid, a thermosetting resin, or a thermoplastic resin, used in the general rubber industry, in addition to the above-described components.

For example, a thiazole-based compound, such as 2-mercaptobenzothiazole (M), dibenzothiazyl disulfide (DM), and N-cyclohexylbenzothiazole-2-sulfenamide (CZ), or a guanidine-based compound, such as diphenylguanidine (DPG), may be used as the vulcanization accelerator, and the vulcanization accelerator may be included in an amount of 0.1 part by weight to 5 parts by weight based on 100 parts by weight of the rubber component.

The process oil acts as a softener in the rubber composition, wherein examples of the process oil may be a paraffin-based, naphthenic-based, or aromatic-based compound, the aromatic-based process oil may be used in consideration of tensile strength and abrasion resistance, and the naphthenic-based or paraffin-based process oil may be used in consideration of hysteresis loss and low temperature characteristics. The process oil, for example, may be included in an amount of 100 parts by weight or less based on 100 parts by weight of the rubber component, and, within this range, decreases in tensile strength and low heat generation property (low fuel consumption property) of the vulcanized rubber may be prevented.

Examples of the antioxidant may be N-isopropyl-N'-phenyl-p-phenylenediamine, N-(1,3-dimethylbutyl)-N'-phenyl-p-phenylenediamine, 6-ethoxy-2,2,4-trimethyl-1,2-dihydroquinoline, or a high-temperature condensate of diphenylamine and acetone, and the antioxidant may be used in an amount of 0.1 part by weight to 6 parts by weight based on 100 parts by weight of the rubber component.

The rubber composition according to the embodiment of the present invention may be obtained by kneading the above mixing formulation using a kneader such as a Banbury mixer, a roll, and an internal mixer, and a rubber composition having excellent abrasion resistance as well as low heat generation property may also be obtained by a vulcanization process after molding.

Accordingly, the rubber composition may be suitable for the preparation of each member of a tire, such as a tire's tread, an under tread, a sidewall, a carcass coating rubber, a belt coating rubber, a bead filler, a chafer, or a bead coating rubber, or various industrial rubber products such as an anti-vibration rubber, a belt conveyor, and a hose.

In addition, the present invention provides a tire prepared by using the rubber composition.

The tire may include a tire or a tire's tread.

Hereinafter, the present invention will be described in more detail, according to specific examples. However, the following examples are merely presented to exemplify the present invention, and the scope of the present invention is not limited thereto.

EXAMPLES

Example 1

85 wt % of n-hexane, from which impurities, such as moisture, were removed, and 15 wt % of a monomer mixture (73 wt % of butadiene and 27 wt % of styrene) were continuously added at a total flow rate of 400 g/hr to a raw material input line of a first reactor among three continuous stirred-tank reactors (CSTR). Also, as an initiator for initiating a reaction, n-butyllithium and 1-phenyl-4-(4-vinylbenzyl)piperazine were added in a molar ratio of 1:1 to the input line, and ditetrahydrofurylpropane (DTP), as a polar additive, was added in a molar ratio of 0.5 to 3 with respect to a molar amount of the n-butyllithium. Next, an internal temperature of the reactor was controlled to be in a range of 70° C. to 85° C. and was maintained for 30 minutes to 60 minutes. Thereafter, a polymer of the first reactor thus obtained was continuously supplied to the top of a second reactor, and an internal temperature of the reactor was controlled to be in a range of 70° C. to 85° C. and was maintained for 60 minutes so that a polymerization conversion rate was 90%. A polymer of the second reactor thus obtained was continuously supplied to the top of a third reactor, N,N-bis(3-diethoxy(methyl)silyl)propyl)-2,5,8,11,14-pentaoxahexadecane-16-amine was continuously supplied in a molar amount equivalent to that of the n-butyllithium to perform a modification reaction. A solution including 5 wt % to 10 wt % of ethyl alcohol and 25 wt % to 35 wt % of an antioxidant (Wingstay-K) was added to a polymer of the third reactor thus obtained at a rate of 0.1556 ml/min to stop the polymerization reaction, and a polymer was obtained. After the polymer obtained was put in hot water heated by steam and stirred to remove the solvent, the residual solvent and water were removed by roll drying to prepare a modified conjugated diene-based polymer. The results of the analysis of the modified conjugated diene-based polymer thus prepared are presented in Table 1 below.

Example 2

Example 2 was performed in the same manner as in Example 1 except that N,N-bis(3-diethoxy(methyl)silyl)propyl)-2,5,8,11,14-pentaoxahexadecane-16-amine was not added in Example 1.

Example 3

Polymerization was performed in the same manner as in Example 2, but the amount of the polymerization initiator (NBL, 1-phenyl-4-(4-vinylbenzyl)piperazine) added was reduced to 20% to 30% of that of Example 2 so that Mooney viscosity or molecular weight of the final polymer was adjusted similar to that of Example 1.

Comparative Example 1

Comparative Example 1 was performed in the same manner as in Example 1 except that the polymerization was performed without the addition of 1-phenyl-4-(4-vinylbenzyl)piperazine, and the polymerization reaction was stopped without the addition of N,N-bis(3-diethoxy(methyl)silyl)propyl)-2,5,8,11,14-pentaoxahexadecane-16-amine in Example 1.

Experimental Example 1

A weight-average molecular weight (Mw, ×10$^3$ g/mol), a number-average molecular weight (Mn, ×10$^3$ g/mol), a molecular weight distribution (MWD), Mooney viscosity (MV), a styrene monomer (SM) content, and a vinyl content were respectively measured for the modified or unmodified conjugated diene-based polymers prepared in the examples and comparative example. The results thereof are presented in Table 1 below.

The weight-average molecular weight (Mw) and the number-average molecular weight (Mn) were measured by gel permeation chromatograph (GPC) analysis, and the molecular weight distribution (MWD, Mw/Mn) was obtained by calculation using each molecular weight measured. Specifically, with respect to the GPC, two PLgel Olexis columns (Polymer Laboratories) and one PLgel mixed-C column (Polymer Laboratories) were combined and used, all newly replaced columns were mixed-bed type columns, and polystyrene (PS) was used as a GPC standard material for the calculation of the molecular weight.

The Mooney viscosity (MV, (ML1+4, @100° C.) MU) was measured with a large rotor at a rotor speed of 2±0.02 rpm at 100° C. using MV-2000 (ALPHA Technologies). After samples used in this case were left standing for 30 minutes or more at room temperature (23±3° C.), 27±3 g of each sample was taken and filled into a die cavity, and the Mooney viscosity was measured for 4 minutes by operating a platen.

The styrene monomer (SM) content and the vinyl content were measured using nuclear magnetic resonance (NMR).

TABLE 1

| Category | Example 1 | Example 2 | Example 3 | Comparative Example 1 |
|---|---|---|---|---|
| Mw (×10³) | 704 | 589 | 648 | 544 |
| Mn (×10³) | 332 | 299 | 349 | 281 |
| MWD | 2.12 | 1.97 | 1.86 | 1.94 |
| MV | 75.9 | 64.1 | 78.9 | 62.3 |
| SM | 27.7 | 27.8 | 27.7 | 27.3 |
| Vinyl | 39.6 | 39.6 | 40.8 | 39.9 |

Experimental Example 2

In order to comparatively analyze physical properties of rubber compositions including each of the modified or unmodified conjugated diene-based polymers prepared in the examples and comparative example and molded articles prepared therefrom, tensile properties, abrasion resistance, and wet road surface resistance were respectively measured, and the results thereof are presented in Table 3 below.

1) Preparation of Rubber Samples

Each of the modified or unmodified styrene-butadiene copolymers of the examples and comparative example was used as a raw material rubber and was mixed under mixing conditions shown in Table 2 below. An amount of each raw material in Table 2 was represented by parts by weight based on 100 parts by weight of the rubber.

TABLE 2

| Category | Raw material | Amount (parts by weight) |
|---|---|---|
| First stage kneading | Rubber (rubber excluding oil content) | 137.5 (100) |
| | Silica | 70 |
| | Coupling agent | 11.2 |
| | Process oil | 25 |
| | Zinc white | 3 |
| | Stearic acid | 2 |
| | Antioxidant | 2 |
| | Anti-aging agent | 2 |
| | Wax | 1 |
| Second stage kneading | Rubber accelerator | 1.75 |
| | Sulfur | 1.5 |
| | Vulcanization accelerator | 2 |

Specifically, the rubber samples were kneaded through first stage kneading and second stage kneading. In the first stage kneading, the raw material rubber (styrene-butadiene copolymer), filler, organosilane coupling agent, process oil, zinc white, stearic acid, antioxidant, anti-aging agent, and wax were kneaded using a Banbury mixer equipped with a temperature control device. In this case, a temperature of the mixer was controlled and a primary formulation was obtained at a discharge temperature of 145° C. to 155° C. In the second stage kneading, after the primary formulation was cooled to room temperature, the primary formulation, rubber accelerator, sulfur, and vulcanization accelerator were added to the mixer, and mixing was performed at a temperature of 100° C. or less to obtain a secondary formulation. Thereafter, a curing process was performed at 160° C. for 20 minutes to prepare each rubber sample.

2) Tensile Properties

Each specimen was prepared according to the tensile test method of ASTM 412, and tensile strength at break of the specimen and tensile stress at 300% elongation (300% modulus) were measured for tensile properties. Specifically, the tensile properties were measured at a rate of 50 cm/min at room temperature using a tensile testing machine, a Universal Test Machine 4204 (Instron).

3) Abrasion Resistance

Abrasion resistances of the rubber samples prepared were measured using a DIN abrasion tester in such a manner that, after a load of 10 N was applied to a rotating drum with abrasive paper and each rubber sample was moved in a direction perpendicular to a rotational direction of the drum, an abrasion weight loss was measured. A rotational speed of the drum was 40 rpm, and a total movement of the sample at the completion of the test was 40 m. The smaller the weight loss was, the better the abrasion resistance was.

4) Viscoelastic Properties

With respect to viscoelastic properties, tan δ was measured in a torsion mode at a frequency of 10 Hz while changing a strain at each measurement temperature (−60° C. to 70° C.) using a dynamic mechanical analyzer (TA Instruments). The Payne effect was expressed as the difference between the maximum value and the minimum value at a strain of 0.28% to 40%. The higher the tan δ at a low temperature of 0° C. was, the better the wet road surface resistance was, and the lower the tan δ at a high temperature of 60° C. was, the lower the hysteresis loss was and the better the low running resistance (fuel economy) was.

TABLE 3

| Category | | Example 1 | Example 2 | Example 3 | Comparative Example 1 |
|---|---|---|---|---|---|
| Tensile properties | 300% modulus (kgf/cm²) | 128.1 | 121.5 | 122.9 | 116.9 |
| | Tensile strength (kgf/cm²) | 196 | 193 | 197 | 189 |
| Abrasion resistance | Weight loss (mg) | 14.4 | 14.2 | 14.1 | 14.6 |
| Viscoelasticity | tan δ@0° C. | 0.906 | 0.878 | 0.875 | 0.818 |
| | tan δ@60° C. | 0.092 | 0.098 | 0.097 | 0.110 |

As illustrated in Table 3, with respect to Examples 2 and 3 prepared according to the present invention, it may be confirmed that tensile properties, abrasion resistance, wet road surface resistance, and low fuel consumption property were all improved in comparison to those of Comparative Example 1 in which modification was not performed. Particularly, with respect to Example 1 in which both ends were modified by using the modification initiator and the modifier, it may be confirmed that the tensile properties, wet road surface resistance, and low fuel consumption property were significantly improved.

From the above results, since the modified conjugated diene-based polymer polymerized using the modification initiator of the present invention had excellent mutual dispersibility with an inorganic filler by including a modification initiator-derived function group at one end, it may be confirmed that processability, tensile properties, abrasion resistance, rolling resistance, and wet road surface resistance were excellent. Furthermore, since the affinity with the inorganic filler was maximized by additional modification at the other end of the modified conjugated diene-based polymer with the modifier in addition to the one end including the modification initiator-derived function group, it may be confirmed that the tensile properties, wet road surface resistance, and low fuel consumption property were significantly improved.

The invention claimed is:

1. A method of preparing a modified conjugated diene-based polymer, the method comprising a step (S1) of preparing an active polymer coupled with an alkali metal by polymerization of a conjugated diene-based monomer, or an aromatic vinyl-based monomer with a conjugated diene-based monomer in a hydrocarbon solvent which includes a modification initiator including a compound represented by Formula 1:

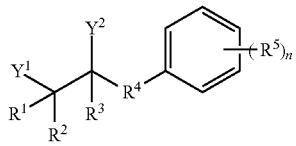
[Formula 1]

wherein, in Formula 1, $Y^1$ and $Y^2$ are each independently M or $R^{15}$, wherein $Y^2$ is $R^{15}$ when $Y^1$ is M, and $Y^2$ is M when $Y^1$ is $R^{15}$, M is an alkali metal, $R^1$, $R^2$, and $R^{15}$ are each independently hydrogen; an alkyl group having 1 to 30 carbon atoms; an alkenyl group having 2 to 30 carbon atoms; an alkynyl group having 2 to 30 carbon atoms; a heteroalkyl group having 1 to 30 carbon atoms which includes a nitrogen (N), oxygen (O), or sulfur (S) atom; a heteroalkenyl group having 2 to 30 carbon atoms which includes an N, O, or S atom; a heteroalkynyl group having 2 to 30 carbon atoms which includes an N, O, or S atom; a cycloalkyl group having 5 to 30 carbon atoms; an aryl group having 5 to 30 carbon atoms; or a heterocyclic group having 3 to 30 carbon atoms which includes at least one of N, O, and S atoms, $R^3$ is hydrogen, $R^4$ is a single bond; an alkylene group having 1 to 20 carbon atoms which is substituted or unsubstituted with an alkyl group having 1 to 10 carbon atoms, a cycloalkyl group having 5 to 10 carbon atoms, or an aryl group having 5 to 20 carbon atoms; a cycloalkylene group having 5 to 20 carbon atoms which is substituted or unsubstituted with an alkyl group having 1 to 10 carbon atoms, a cycloalkyl group having 5 to 10 carbon atoms, or an aryl group having 5 to 20 carbon atoms; or an arylene group having 5 to 20 carbon atoms which is substituted or unsubstituted with an alkyl group having 1 to 10 carbon atoms, a cycloalkyl group having 5 to 10 carbon atoms, or an aryl group having 5 to 20 carbon atoms, $R^5$ is an alkyl group having 1 to 30 carbon atoms; an alkenyl group having 2 to 30 carbon atoms; an alkynyl group having 2 to 30 carbon atoms; a heteroalkyl group having 1 to 30 carbon atoms which includes an N, O, or S atom; a heteroalkenyl group having 2 to 30 carbon atoms which includes an N, O, or S atom; a heteroalkynyl group having 2 to 30 carbon atoms which includes an N, O, or S atom; a cycloalkyl group having 5 to 30 carbon atoms; an aryl group having 5 to 30 carbon atoms; a heterocyclic group having 3 to 30 carbon atoms which includes at least one of N, O, and S atoms; a functional group represented by Formula 2; or a functional group represented by Formula 3, n is an integer selected from 1 to 5, at least one of $R^5$ is the functional group represented by Formula 2 or 3, and a plurality of $R^5$ are the same or different from each other when n is an integer selected from 2 to 5,

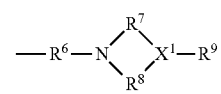
[Formula 2]

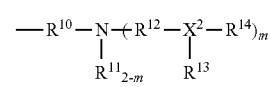
[Formula 3]

wherein, in Formulae 2 and 3, $R^6$ and $R^{10}$ are each independently an alkylene group having 1 to 20 carbon atoms which is substituted or unsubstituted with an alkyl group having 1 to 10 carbon atoms, a cycloalkyl group having 5 to 10 carbon atoms, or an aryl group having 5 to 20 carbon atoms; a cycloalkylene group having 5 to 20 carbon atoms which is substituted or unsubstituted with an alkyl group having 1 to 10 carbon atoms, a cycloalkyl group having 5 to 10 carbon atoms, or an aryl group having 5 to 20 carbon atoms; or an arylene group having 5 to 20 carbon atoms which is substituted or unsubstituted with an alkyl group having 1 to 10 carbon atoms, a cycloalkyl group having 5 to 10 carbon atoms, or an aryl group having 5 to 20 carbon atoms, $R^7$, $R^8$, and $R^{12}$ are each independently an alkylene group having 1 to 20 carbon atoms which is substituted or unsubstituted with an alkyl group having 1 to 10 carbon atoms, a cycloalkyl group having 5 to 10 carbon atoms, or an aryl group having 5 to 20 carbon atoms, $R^9$, $R^{11}$, $R^{13}$, and $R^{14}$ are each independently hydrogen; an alkyl group having 1 to 30 carbon atoms; an alkenyl group having 2 to 30 carbon atoms; an alkynyl group having 2 to 30 carbon atoms; a heteroalkyl group having 1 to 30 carbon atoms which includes an N, O, or S atom; a heteroalkenyl group having 2 to 30 carbon atoms which includes an N, O, or S atom; a heteroalkynyl group having 2 to 30 carbon atoms which includes an N, O, or S atom; a cycloalkyl group having 5 to 30 carbon atoms; an aryl group having 5 to 30 carbon atoms; a heterocyclic group having 3 to 30 carbon atoms which includes at least one of N, O, and S atoms; an alkenyl group having 2 to 30 carbon atoms which is substituted with an alkyl group having 1 to 10 carbon atoms which includes an alkali metal; or an aryl group having 6 to 30 carbon atoms which is substituted with an alkyl group having 1 to 10 carbon atoms which includes an alkali metal, $X^1$ and $X^2$ are each independently one selected from N, O, and S atoms, $R^9$ is not present when $X^1$ is an O or S atom, $R^{14}$ is not present when $X^2$ is an O or S atom, and m is an integer of 1 or 2.

2. The method of claim 1, wherein the compound represented by Formula 1 is used in an amount of 0.01 mmol to 10 mmol based on total 100 g of the monomer.

3. The method of claim 1, wherein
in Formula 1,
$Y^1$ and $Y^2$ are each independently M or $R^{15}$, wherein $Y^2$ is $R^{15}$ when $Y^1$ is M, and $Y^2$ is M when $Y^1$ is $R^{15}$, M is an alkali metal, $R^1$, $R^2$, and $R^{15}$ are each independently hydrogen; an alkyl group having 1 to 30 carbon atoms; an alkenyl group having 2 to 30 carbon atoms; and an alkynyl group having 2 to 30 carbon atoms, $R^3$ is hydrogen, $R^4$ is a single bond; or an unsubstituted alkylene group having 1 to 20 carbon atoms, $R^5$ is an alkyl group having 1 to 30 carbon atoms; an alkenyl group having 2 to 30 carbon atoms; an alkynyl group having 2 to 30 carbon atoms; a functional group represented by Formula 2; or a functional group represented by Formula 3, n is an integer selected from 1 to 5, at least one of $R^5$ is the functional group represented by Formula 2 or 3, and a plurality of $R^5$ are the same or different from each other when n is an integer selected from 2 to 5, wherein, in Formulae 2 and 3, $R^6$ and $R^{10}$ are each independently an unsubstituted alkylene group having 1 to 20 carbon atoms, $R^7$, $R^8$, and $R^{12}$ are each independently an unsubstituted alkylene group having 1 to 20 carbon atoms, $R^9$, $R^{11}$, $R^{13}$, and $R^{14}$ are each independently hydrogen; an alkyl group having 1 to 30 carbon atoms; a cycloalkyl group having 5 to 30 carbon atoms; an aryl group having 5 to 30 carbon atoms; an alkenyl group having 2 to 30 carbon atoms which is substituted with an alkyl group having 1 to 10 carbon atoms which includes an alkali metal; or an aryl group having 6 to 30 carbon atoms which is substituted with an alkyl group having 1 to 10 carbon atoms which includes an alkali metal, $X^1$ and $X^2$ are each independently an N atom, and m is an integer of 1 or 2.

4. The method of claim 1, wherein the compound represented by Formula 1 comprises one selected from the group consisting of compounds represented by Formulae 1-1 to 1-13:

[Formula 1-1]
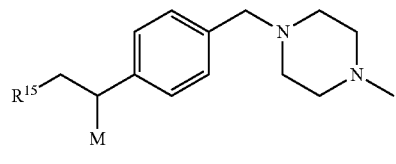

[Formula 1-2]
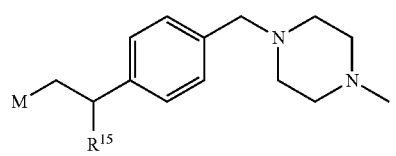

[Formula 1-3]
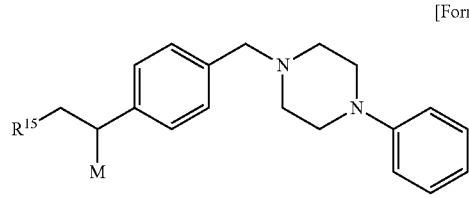

[Formula 1-4]
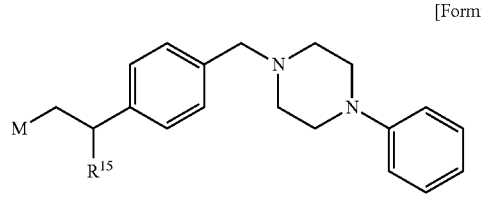

[Formula 1-5]
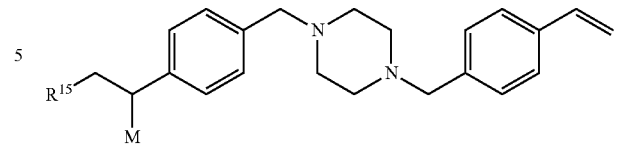

[Formula 1-6]
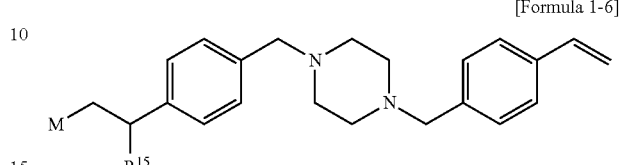

[Formula 1-7]
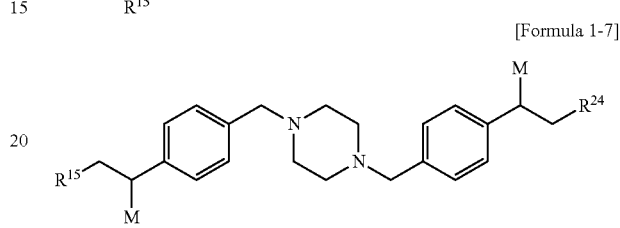

[Formula 1-8]
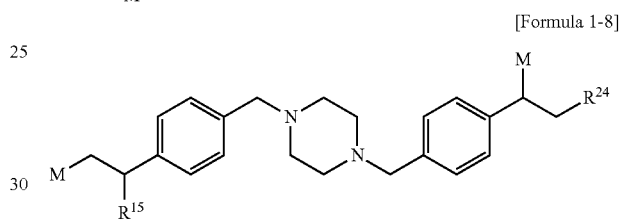

[Formula 1-9]
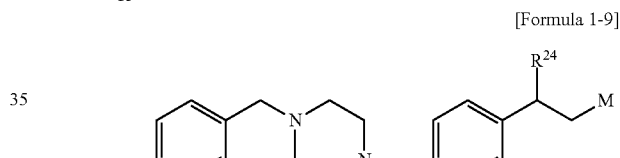

[Formula 1-10]
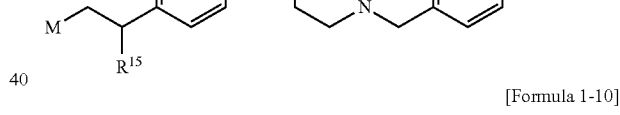

[Formula 1-11]
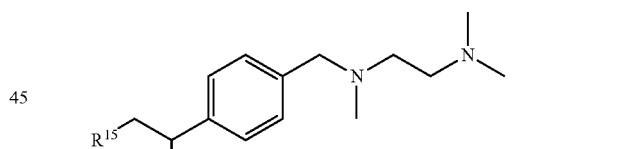

[Formula 1-12]

[Formula 1-13]

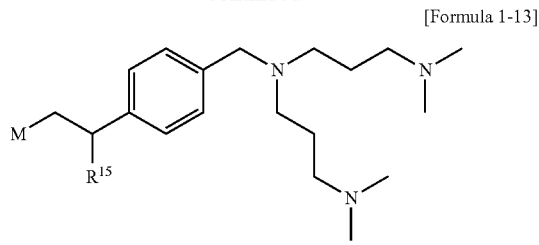

wherein, in Formulae 1-1 to 1-13,

M is an alkali metal, $R^{15}$ is hydrogen; an alkyl group having 1 to 30 carbon atoms; an alkenyl group having 2 to 30 carbon atoms; or an alkynyl group having 2 to 30 carbon atoms, and $R^{24}$ is hydrogen or an alkyl group having 1 to 8 carbon atoms.

5. The method of claim 1, wherein the polymerization of the step (S1) is performed by including a polar additive.

6. The method of claim 5, wherein the polar additive comprises at least one selected from the group consisting of tetrahydrofuran, ditetrahydrofurylpropane, diethylether, cycloamylether, dipropyl ether, ethylene dimethyl ether, diethyl glycol, dimethyl ether, tertiary butoxyethoxyethane, bis(3-dimethylaminoethyl)ether, (dimethylaminoethyl)ethylether, trimethylamine, triethylamine, tripropylamine, and tetramethylethylenediamine.

7. The method of claim 1, further comprising a step (S2) of reacting the active polymer prepared in the step (Si) with a modifier.

8. The method of claim 7, wherein a molar ratio of the compound represented by Formula 1 to the modifier is in a range of 1:0.1 to 1:10.

9. The method of claim 7, wherein the modifier is a modifier comprising a compound represented by Formula 4:

[Formula 4]

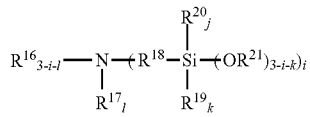

wherein, in Formula 4, $R^{16}$ and $R^{17}$ are each independently hydrogen, a hydrocarbon group having 1 to 30 carbon atoms, or a glycol unit represented by

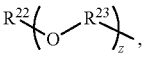

$R^{18}$ is a divalent hydrocarbon group having 1 to 30 carbon atoms, $R^{19}$ to $R^{22}$ are each independently a monovalent hydrocarbon group having 1 to 30 carbon atoms, $R^{23}$ is a divalent hydrocarbon group having 1 to 10 carbon atoms, j and k are each independently 0 or 1, z is an integer selected from 1 to 10, at least one of $R^{16}$ and $R^{17}$ is a glycol unit represented by

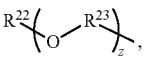

i and 3-i-l are each independently 1 or 2, but are not 2 at the same time, and 1 is 0 or 1 when $R^{16}$ is a glycol unit represented by

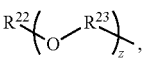

i and l are each independently 1 or 2, but are not 2 at the same time, and 3-i-l is 0 or 1 when $R^{17}$ is a glycol unit represented by

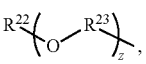

and i is 1 or 2, and 1 and 3-i-l are each independently 0 or 1, but are not 0 at the same time when both $R^{16}$ and $R^{17}$ are glycol units represented by

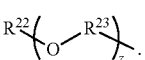

10. The method of claim 9, wherein the compound represented by Formula 4 comprises one selected from the group consisting of compounds represented by Formulae 4a to 4e:

[Formula 4a]

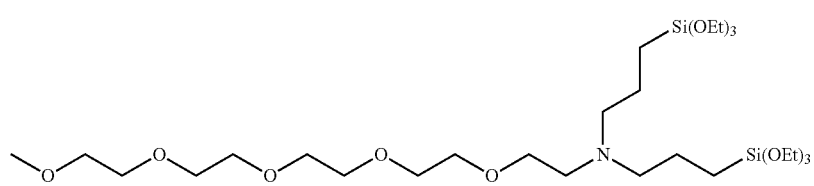

[Formula 4b]

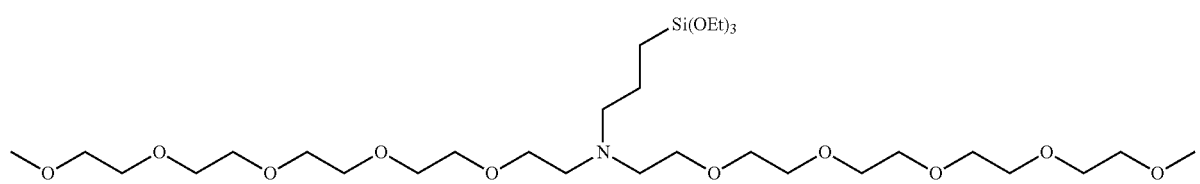

[Formula 4c]
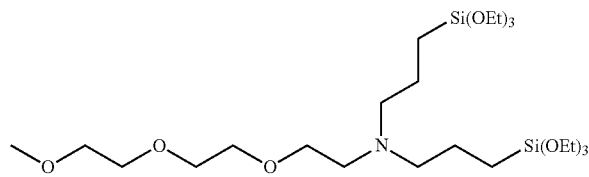
[Formula 4d]
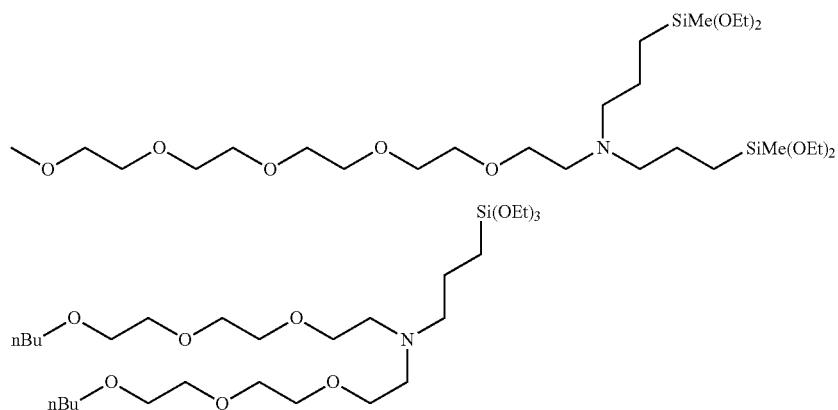
[Formula 4e]
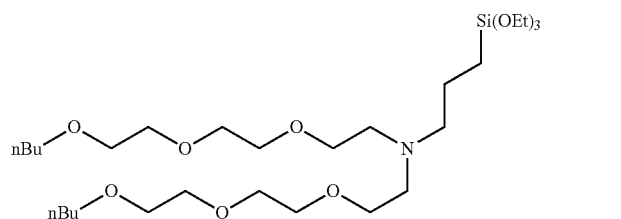
wherein, in Formulae 4a to 4e,
Me is a methyl group, Et is an ethyl group, and nBu is an n-butyl group.
* * * * *